Figure 1:
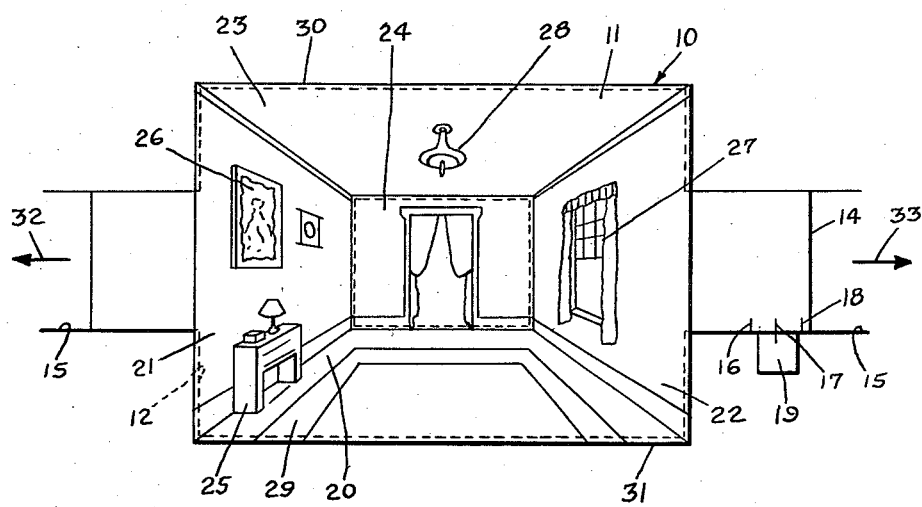

July 9, 1957  S. H. KNEITEL  2,798,407
MEANS AND METHOD FOR PRODUCING THREE DIMENSIONAL PICTURES FROM
SUBJECTS POSITIONED SUBSTANTIALLY IN A COMMON PLANE
Filed July 10, 1953

INVENTOR
SEYMOUR KNEITEL
BY
ATTORNEY

United States Patent Office 2,798,407
Patented July 9, 1957

2,798,407

MEANS AND METHOD FOR PRODUCING THREE DIMENSIONAL PICTURES FROM SUBJECTS POSITIONED SUBSTANTIALLY IN A COMMON PLANE

Seymour H. Kneitel, New York, N. Y., assignor to Paramount Pictures Corporation, New York, N. Y., a corporation of New York Application July 10, 1953, Serial No. 367,251

10 Claims. (Cl. 88—16)

This invention relates to the production of what is commonly referred to as three-dimensional pictures, in other words, pictures having depth where the subjects photographed, at least in part, are maintained in a common plane, such, for example, as a flat plane which may be regarded as a photographic field.

More particularly, the invention deals with the taking of pictures of the kind under consideration, which might be in the form of cartoons, and where the present concern is with the control and regulation of the background or perspective environment of the picture rather than the cartoon subjects that are movable in or produce action in said background or perspective environment.

Still more particularly, the invention deals with a method wherein the so-called photographic field, comprising the background or perspective showing of an environment, is arranged upon a sheet of flexible or extensible material of what might be termed an all-way stretch material. A suitable means is provided for shifting the material in the taking of what might be termed the left and right eye dual pictures of the photographic field.

Figure 2:
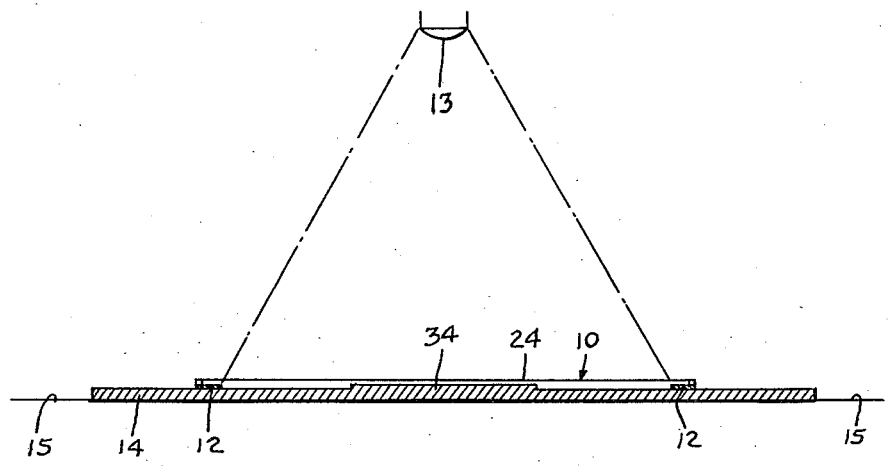

The novel features of the invention will be best understood from the following description when taken together with the accompanying drawing, in which certain embodiments of the invention are disclosed, and in which the separate parts are designated by suitable reference characters in each of the views; and in which:

Fig. 1 is a diagrammatic pictorial view of a perspective environment, painted, photographed, or otherwise applied to a sheet of partially stretched flexible material, and indicating the slide for actuating the material in the taking of three-dimensional pictures; and Fig. 2 is a longitudinal diagrammatic sectional view through the structure as shown in Fig. 1.

In the taking of three-dimensional pictures of what might be termed flatly disposed subjects, or subjects arranged in a predetermined photographic plane or field, such, for example, as the photography of cartoons in three-dimensions, according to the teachings of a companion application filed of equal date herewith, difficulty is experienced and limitations are required in order to prevent distortions. This is particularly true with respect to the foreground showings of an environment with respect to which the movable cartoons are arranged. It would be possible to overcome these objectionable characteristics by extensive drawings and calculations to dispose successive pictures being photographed in the proper parallax, but such a procedure would be prohibitive from the standpoint of cost. In overcoming these objectionable features, the subjects of the foreground and background of a picture are left plain to avoid the distortions above referred to.

With my present conception, however, and by arranging the foreground, background, as well as the perspective environment, on a partially stretched flexible sheet, and then actuating the depth background showing of the environment so as to care automatically for the proper parallax in taking left and right eye pictures, the desired result can be accomplished in a very simple, commercially economical and practical manner, it being understood in this connection that a single reproduction of the flexible sheet of a single view or environment is all that will be required in taking the successive pictures of the moving subjects of the cartoon which are moving or acting within such environment. At the same time, it will be understood that as the environment changes, then successive environmental sheets will be utilized as in the present practice of taking the well known animated cartoons.

While my invention is not limited to any particular arrangement of a photographic environmental field, nor to any particular shifted area of such field, for purposes of illustrating one adaptation and use of my invention I have diagrammatically shown in Figs. 1 and 2 of the accompanying drawing, an environmental field 10 to be photographed, the environment of the field 10 being printed, painted or photographed upon a sheet 11 of rubber, or any other type of flexible material, this sheet being supported in a partially extended or stretched position on a rectangular frame 12, which is suitably supported on the bed of a camera, the lens of the camera being diagrammatically illustrated in part at 13 in Fig. 2 of the drawing. The stretching of the sheet 11 is such as to place the entire field of said sheet under a slight tension, so that it maintains a constant position when the picture is at what might be termed rest, as shown in Fig. 1 of the drawing. At 14 is shown a slide mounted in a groove 15 of the camera bed, and having at one end portion three gauge marks 16, 17 and 18 movable relatively to an indicator mark 19 fixed to the bed.

In the illustration of the environment on the sheet 11, I have shown the perspective of a room or end portion of a room, and, in this illustration, 20 represents the floor, 21 and 22 the left and right side walls, 23 the ceiling, and 24 the back wall. Disposed along the wall 21 is the representation of a table 25, over which is a picture 26, whereas the wall 22 has the representation of a window 27, and depending from the ceiling 23 is a light 28. Arranged on the floor 20 is a rug 29.

In practice, that portion of the sheet 11 on which the back wall portion 24 of the environment is portrayed, is in its entirety secured to the slide 14. It will also be apparent that the slide and its movement in the groove 15 moves parallel to upper and lower edges 30 and 31 of the sheet 11. It will thus be seen that if the slide 14 is moved in the direction of the arrow 32, the back wall 24 will move in the same direction and will correspondingly modify the perspective of the entire environment, except for the back wall 24. This movement is gauged by moving the indicator or mark 18 in registration with the mark 19, and produces one of the required parallax in taking one of the pictures which are required.

It will thus be apparent that, in movement of the slide 14 to bring the indicator 16 in registration with the mark 19, the slide 14 is moved in the direction of the arrow 33, correspondingly moving the back wall 24, and again correspondingly changing the parallax and, in other words, arrangement of the pictorial showing in the perspective environment. These two movements are precalculated with respect to position of the lens 13 so as to produce in the simultaneous projection what can be termed the left and right eye pictures, a three-dimensional showing when the projected picture is viewed by the use of Polaroid glasses, or similar methods in acquiring depth allusion.

It will also be apparent in this connection that in viewing stills through the conventional viewing glasses, or viewers such as the stereoscopes, the third dimensional vision will be obtained of the two photographed pictures as mentioned above. This particular phase of the conception is mentioned primarily from the standpoint of individual uses for the amateur photograher, but stills can also be utilized in the more commercial sense in the stereoscopic type of projection provided that Polaroid glasses, or the like, are utilized in viewing such pictures.

In the aforesaid operation, it will be understood that a single camera can be utilized in the photography of the picture, and a series of shots can be taken with the slide disposed in one setting and with the cartoons or other moving figures in different positions in the successive shots taken, and then these positions are repeated with the slide set in the opposed parallax position. Thus, in assembling the successive shots in producing motion pictures, long film lengths in successive shots can be joined with corresponding lengths of the associate shots, and for purposes of reference one length can be regarded as the right eye shots and the other length as the left eye shots.

In the foregoing mentioned movement of the environmental field, it will be apparent that this field has motion solely in a plane paralleling the upper and lower edges 30 and 31, which edges remain fixed. In this manner, such representations as the table 25, picture 26, window 27, and light 28, will, in the resulting three-dimensional composition as projected onto a screen and when viewed in the manner heretofore stated appear to have no distortion or change. In the same sense, the rug 29 on the floor 20 will be properly portrayed. It will thus be understood that the perspective reproduction as disposed upon the sheet 11 gives, in the resulting projected picture, the extreme depth so as to accurately dispose the characters that may be taken with this environment as standing in and moving in the room.

It will be apparent that when the slide 14 is released from the setting positions at 16 and 18, it will automatically return to the setting as at 17 by the material of the sheet 11 returning to its normal pre-stretched or extended state. The actual movement of the entire sheet is nominal so that at no time will any part of the sheet assume anything but an extended or stretched position.

In Fig. 2 of the drawing, the attachment of the back wall portion 24 to the slide is diagrammatically illustrated by the shade line 34 of said figure, and the slide 14 is otherwise completely free to move relatively to all other parts of the sheet.

It will be apparent that while I have, for purposes of illustration, described the use of the flexible field or characterized environment in the taking of animated cartoon pictures, that this flexible field can be utilized in any type or kind of photography, particularly where it is desirable to produce three-dimensional or environmental effects, in other words, scenery of any type or kind of photographed environment can be arranged and photographed in accordance with the teachings of the present disclosure, it being understood that in all cases the parallax will be precalculated with respect to the single camera lens employed in the taking of the series or successive left and right eye pictures in producing the ultimate environmental effects.

By way of further explaining the phenomena of my new method of three-dimensional photography, it might be well to point out that where the environment or what might be termed background showing remains stationary, and the actor or character of a cartoon is photographed as moving over the field, the realization of depth or three-dimension is limited to the perspective of the background showing, it being understood that all subjects photographed are in a single flat plane. However, by movement of the environment as herein taught, the scenery behind the actor or character is photographed in two different positions, which results in production of a true three-dimensional presentation.

My present conception can also be utilized in photographing titles of pictures of the kind under consideration, or any other type and kind of portraying or characterizing matter that is suitable in producing and projecting pictures of the kind under consideration. In this connection, it will be kept in mind that the flexible sheet can have photographs printed, or otherwise disposed thereon, and acutated to produce the effects herein specifically defined.

For purposes of description, that part of the sheet which is referred to as the back wall 24 may be said to comprise an unyielding section, that is to say, while this section is normally stretched it does not yield in movement of the slide in the taking of the successive pictures as heretofore mentioned.

It will be apparent that, in the taking of pitcures by the use of the environmental background, other scenes may be disposed in front of this background, as well as the characters or objects of the animated cartoon being produced, for example, in accordance with the teachings of a companion application Serial Number 367,319, filed July 10, 1953.

Having fully described my invention, what I claim and desire to secure by Letters Patent is:

1. In three-dimensional photography wherein a single camera lens is utilized in photographing a scene, a flexible characterized field portraying the basic scenery of a picture to be taken, said characterized field comprising an extended sheet of yieldable material on which picture characterizations are applied, means supporting peripheral edges of the sheet in fixed position, the picture characterizations of the sheet including a non-yielding background section disposed intermediate said peripheral edges and in spaced relation thereto, and means fixed to and supporting said background section for actuating the same in its entirety to move non-yieldingly into different precalculated positions in the taking of a series of left and right eyed pictures suitable for projection onto a screen in producing three-dimensional effects when viewed through Polaroid lenses.

2. In three-dimensional photography wherein a single camera lens is utilized in photographing a scene, a flexible characterized field portraying the basic scenery of a picture to be taken, said characterized field comprising an extended sheet of yieldable material on which picture characterizations are applied, means supporting peripheral edges of the sheet in fixed position, the picture characterizations of the sheet including a non-yielding background section disposed intermediate said peripheral edges and in spaced relation thereto, and means fixed to and supporting said background section for actuating the same in its entirety to move non-yieldingly into different precalculated positions in the taking of a series of left and right eyed pictures suitable for projection onto a screen in producing three-dimensional effects when viewed through Polaroid lenses, and said means comprising a slide movable in a plane paralleling two opposed edges of said sheet.

3. In three-dimensional photography wherein a single camera lens is utilized in photographing a scene, a flexible characterized field portraying the basic scenery of a picture to be taken, said characterized field comprising an extended sheet of yieldable material on which picture characterizations are applied, means supporting peripheral edges of the sheet in fixed position, the picture characterizations of the sheet including a non-yielding background section disposed intermediate said peripheral edges and in spaced relation thereto, means fixed to and supporting said background section for actuating the same in its entirety to move non-yieldingly into different precalculated positions in the taking of a series of left and right eyed pictures suitable for projection onto a screen in producing three-dimensional effects when viewed through Polaroid lenses, and the picture characterizations on said sheet around said background section being arranged in perspective to simulate depth.

4. An environmental background for use in taking a series of left and right eyed pictures in producing in the projection of said pictures three-dimensional vision when viewed through Polaroid lenses, said background comprising a normally tensioned sheet of freely extensible material, said sheet having picture representations to give a perspective of a background showing to be photographed, means maintaining peripheral edge portions of the sheet in fixed position, the sheet including a non-yielding section disposed within and spaced from peripheral edges of said sheet, a member to which said section is secured and held in its normal extended position, and means gauging movement of said member to control movement of said sheet around said section and within said fixed edge portions to gauge the parallax in the taking of left and right eyed pictures of said environmental background.

5. An environmental background for use in taking a series of left and right eyed pictures in producing in the projection of said pictures three-dimensional vision when viewed through Polaroid lenses, said background comprising a normally tensioned sheet of freely extensible material, said sheet having picture representations to give a perspective of a background showing to be photographed, means maintaining peripheral edge portions of the sheet in fixed position, the sheet including a non-yielding section disposed within and spaced from peripheral edges of said sheet, a member to which said section is secured and held in its normal extended position, means gauging movement of said member to control movement of said sheet around said section and within said fixed edge portions to gauge the parallax in the taking of left and right eyed pictures of said environmental background, and said member being movable in a path parallel with respect to two opposed fixed edges of said sheet.

6. In three-dimensional photography, a characterized sheet of all-way extensible material, means fixing peripheral edges of the sheet in predetermined position, means engaging a predetermined characterized section of the sheet within and spaced from said peripheral edges for retaining said section in non-yielding position and for moving said section of the sheet in positions parallel with respect to two opposed fixed edges of the sheet and for changing characteristics of the picture characterizations on the sheet between said section and said peripheral edges.

7. In three-dimensional photography, a characterized sheet of all-way extensible material, means fixing peripheral edges of the sheet in predetermined position, means engaging a predetermined characterized section of the sheet within and spaced from said peripheral edges for retaining said section in non-yielding position and for moving said section of the sheet in positions parallel with respect to two opposed fixed edges of the sheet and for changing characteristics of the picture characterizations on the sheet between said section and said peripheral edges, said means comprising a slide to which said section is immovably fixed, and said slide being movable in a plane paralleling two opposed edges of the sheet.

8. The herein described method of producing three-dimensional representations of flat subjects, which comprises picture characterizing a flat sheet of all-way extensible material with a perspective representation of an environment, fixing the position of peripheral edges of said sheet, providing on the sheet a predetermined picture characterized section, moving said section into one position in taking one series of pictures, then moving said section into another position in takng another and associate series of pictures, maintaining the picture characterized field of said section immovable within the section in said aforesaid movements, while moving the remainder of the picture characterizations of the sheet within the boundaries of said peripheral edges, and attaining in the simultaneous showing of said two series of pictures a three-dimensional effect.

9. The method of producing three-dimensional animated cartoons, which comprises utilizing a flat background sheet of all-way yieldable material, maintained in a partially extended position at all times, applying picture characterizations on the sheet in perspective, fixing peripheral edges of the sheet against movement, providing on the sheet a predetermined characterized picture section disposed in spaced relation to said peripheral edges, photographing said sheet in two precalculated parallax positions for the left and right eye in series of pictures, each series of pictures having common cartoon subjects, and actuating said section, without movement to the picture characterizations thereon, to the two precalculated positions in the taking of said pictures.

10. The method of photographing a scene in the production of three dimensional reproductions of the scene, which comprises utilizing a background picture environmental sheet of yielding material, supporting peripheral edges of said sheet, supporting a section of the sheet within and spaced from said peripheral edges against yielding movement, moving said sheet between said section and peripheral edges in two different parallax positions in taking two series of common pictures, whereby, in the showing of said common pictures in each series through suitable lenses, a three dimensional representation will be produced.

References Cited in the file of this patent

UNITED STATES PATENTS

| | | |
|---|---|---|
| 1,698,178 | Van Deventer | Jan. 8, 1929 |
| 2,057,051 | Owens | Oct. 13, 1936 |
| 2,522,662 | Brier et al. | Sept. 19, 1950 |
| 2,560,658 | Pareto | July 17, 1951 |

FOREIGN PATENTS

| | | |
|---|---|---|
| 13,644 | Great Britain | of 1898 |
| 721,630 | France | Dec. 22, 1931 |